C. O. CARLYLE.
WRENCH.
APPLICATION FILED OCT. 18, 1910.
993,223.
Patented May 23, 1911.
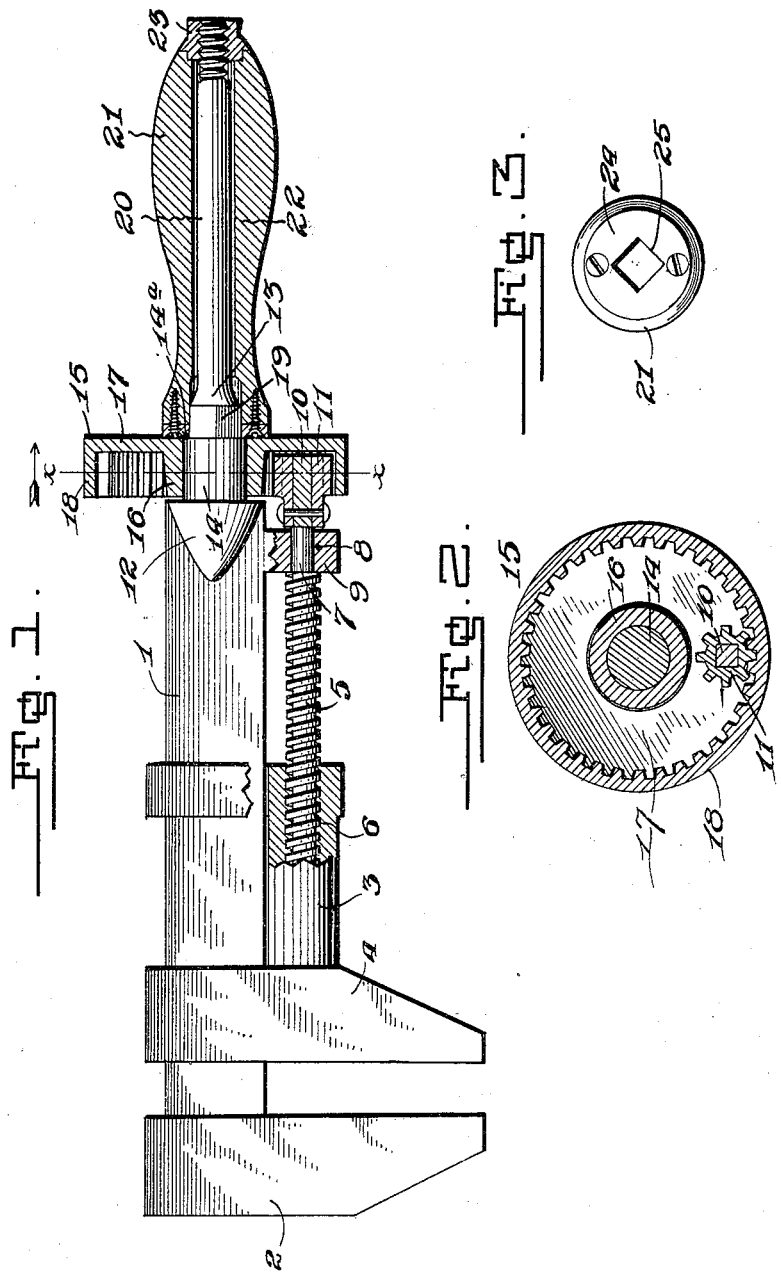
Inventor
Clyde O. Carlyle
Witnesses
C. Everett Lancaster
J. Stewart Rice
By E. P. Vrooman,
his Attorney

UNITED STATES PATENT OFFICE.

CLYDE O. CARLYLE, OF CLYDE, NORTH DAKOTA.

WRENCH.

993,223.  Specification of Letters Patent.  Patented May 23, 1911.

Application filed October 18, 1910. Serial No. 587,664.

*To all whom it may concern:*

Be it known that I, CLYDE O. CARLYLE, a citizen of the United States, residing at Clyde, in the county of Cavalier and State of North Dakota, have invented certain new and useful Improvements in Wrenches, of which the following is a specification, reference being had therein to the accompanying drawing.

My invention relates to improvements in wrenches, and has for its object to provide a wrench, the jaws of which can be easily and quickly adjusted by a comparatively slight movement of the adjusting means.

Other objects and advantages of my invention will appear in the course of the following specification.

In the accompanying drawings: Figure 1 is a side elevation, partly in section, of my improved wrench. Fig. 2 is a sectional view on the line $x$—$x$ of Fig. 1, looking in the direction indicated by the arrow. Fig. 3 is an end elevation of the inner or larger end of the handle.

Referring to the drawings, which illustrate the preferred embodiment of my invention, 1 designates the shank or wrench bar, which is provided at its outer end with a fixed head 2. Slidably mounted on the shank 1 is a frame or carriage 3 provided with a jaw 4. Adapted to move the frame and its jaw back and forth with respect to the fixed head 2 is a non-traveling screw 5, which is positioned longitudinally beneath the shank 1. The screw 5 has its forward end working in a threaded circular socket or aperture 6 formed in the frame 3, while contiguous its other end is a short cylindrical unthreaded portion 7, which is positioned in a circular aperture or bearing 8 in a lug 9 depending from the under side of the shank 1. The extreme inner end 10 of the screw is square and fixedly mounted on said square portion is a gear wheel 11, which extends beyond the end of the shank 1 for a purpose to be hereinafter explained.

The inner end of the shank 1 is provided on each side (only one of which is shown) with a semi-conical protuberance 12, the base ends of which terminate flush with the end of the shank. Extending rearwardly from the end of the shank and integral therewith is a shaft 13, which adjoining the end of the shank is provided with a short cylindrical portion 14 upon which is rotatably mounted a gear wheel 15 which is relatively large as compared with gear wheel 11. The gear wheel 15 comprises a hub 16 from the outer end of which and at right angles thereto extends a circular flange 17, which is provided with a right angular annular flange 18, which overhangs the hub 16 and extends out flush with the end thereof. The inner face of the flange 18 is provided with a continuous set of teeth, and, as illustrated, the gear wheel 11 extends into the gear wheel 15 where the teeth of the two gear wheels mesh.

The shaft 13 at the termination of the cylindrical portion 14 is squared as at 19, and from the end of the square portion it is reduced forming a shoulder 14$^a$ and rounded to form a tang 20, the outer or free end of which is threaded. A handle 21 provided with a central bore 22 is positioned on the tang 20 and securely clamped in position by means of a nut 23 mounted on the threaded end of the tang. As best seen in Fig. 3, the inner or larger end of the handle 21 has secured thereon by suitable fastening means a circular washer or plate 24 provided with a centrally located square aperture 25. As shown in Fig. 1, the aperture 25 is of such size as to fit snugly on the square portion 19 of the shaft 13 and the washer abuts the shoulder 14$^a$ formed by the reducing of the cylindrical portion 14 to form the square portion 19.

What I claim is:—

In a wrench, a shank, a fixed jaw carried by said shank, a frame slidably mounted on said shank, a screw engaging said frame, a gear wheel mounted on said screw, a relatively larger gear wheel mounted contiguous the inner end of said shank, a shaft projecting from the inner end of said shank and constituting a bearing for said larger gear wheel, said shaft being reduced to form a shoulder contiguous said larger gear wheel, and a handle mounted on said shaft and abutting said shoulder to maintain said larger gear wheel in position.

In testimony whereof I hereunto affix my signature in presence of two witnesses.

CLYDE O. CARLYLE.

Witnesses:
W. T. O'NEILL,
CHAS. DEVINE.

---

Copies of this patent may be obtained for five cents each, by addressing the "Commissioner of Patents, Washington, D. C."